No. 662,586. Patented Nov. 27, 1900.
F. BERARDI.
DEVICE FOR SECURING PIPES.
(Application filed Aug. 13, 1898.)
(No Model.)
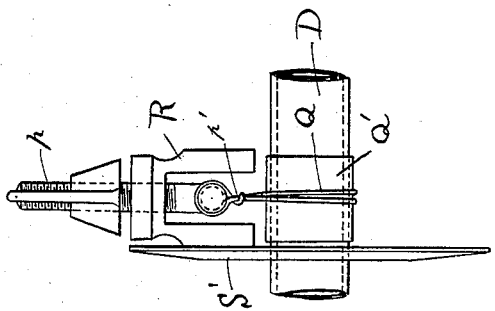
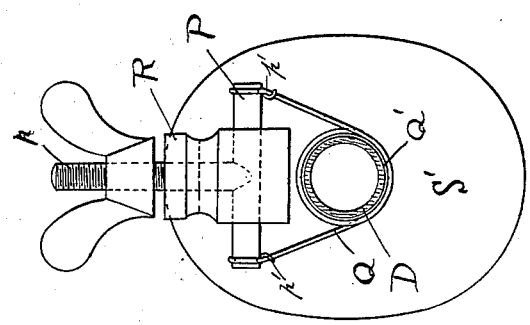
WITNESSES:
INVENTOR
Fortunato Berardi
BY
ATTORNEYS
THE NORRIS PETERS CO., PHOTO-LITHO., WASHINGTON, D. C.

UNITED STATES PATENT OFFICE.

FORTUNATO BERARDI, OF NAPLES, ITALY.

DEVICE FOR SECURING PIPES.

SPECIFICATION forming part of Letters Patent No. 662,586, dated November 27, 1900.

Application filed August 13, 1898. Serial No. 688,538. (No model.)

*To all whom it may concern:*

Be it known that I, FORTUNATO BERARDI, a subject of the King of Italy, and a resident of the city of Naples, in the Kingdom of Italy, have invented certain new and useful Improvements in Devices for Securing Pipes, of which the following is a specification.

My invention relates to an improved means for tightening a wire around a supply-hose of a small motor for connecting the same to any suitable source, such as a cock, faucet, or the like.

The invention is illustrated in the accompanying drawings, in which—

Figure 1 is a front view, and Fig. 2 a side view.

In the drawings, D represents a section of the hose around which the wire is to be tightened, and which is designed to be slipped over the projecting end of a pipe or faucet, (not shown,) to which it is desired to connect the said hose D, the neck of the stationary pipe or faucet entering the hose D to beyond the part where the wire surrounds the same. A plate S' supports a bracket R, through which passes loosely the threaded shank $p$ of a T-shaped bar, the head or cross-bar P of which has a wire Q connected to its ends at $p'\ p'$. The wire is coiled a couple of times around the hose D and is tightened by screwing upon the nut S, threaded upon the shank $p$ and adapted to bear upon the bracket.

In order to prevent the wire Q from cutting into the hose D, a sleeve Q' may be interposed, as shown.

What I claim is—

A device for securing pipes and the like comprising a bracket, a rod passing through the same, a thumb-screw threaded upon the upper end of said rod and adapted to bear against the upper side of the bracket, a cross-bar at the lower end of said rod and a wire adapted to encircle the pipe or the like and having its ends connected to the ends of said cross-bar, substantially as described.

In witness whereof I have hereunto set my hand in presence of two witnesses.

FORTUNATO BERARDI.

Witnesses:
ANTONIO GOADAGERO,
ENRICO LOMANDO.